United States Patent
Pedersen et al.

(10) Patent No.: US 12,513,473 B2
(45) Date of Patent: Dec. 30, 2025

(54) HEARING AID INCLUDING WIND NOISE REDUCTION

(71) Applicant: Oticon A/S, Smørum (DK)

(72) Inventors: Michael Syskind Pedersen, Smørum (DK); Sam Nees, Smørum (DK); Sigurdur Sigurdsson, Smørum (DK); Silvia Tarantino, Smørum (DK); Svend Feldt, Ballerup (DK); Fares El-Azm, Smørum (DK)

(73) Assignee: Oticon A/S, Smørum (DK)

( * ) Notice: Subject to any disclaimer, the term of this patent is extended or adjusted under 35 U.S.C. 154(b) by 172 days.

(21) Appl. No.: 18/440,983

(22) Filed: Feb. 14, 2024

(65) Prior Publication Data

US 2024/0284127 A1    Aug. 22, 2024

(30) Foreign Application Priority Data

Feb. 17, 2023  (EP) .................................... 23157368

(51) Int. Cl.
    *H04R 25/00* (2006.01)
(52) U.S. Cl.
    CPC ......... *H04R 25/505* (2013.01); *H04R 25/405* (2013.01); *H04R 25/407* (2013.01); *H04R 25/552* (2013.01); *H04R 2410/07* (2013.01)

(58) Field of Classification Search
    None
    See application file for complete search history.

(56) References Cited

U.S. PATENT DOCUMENTS

| | | | |
|---|---|---|---|
| 7,171,088 B2 | 1/2007 | Koyama et al. | |
| 2006/0120540 A1* | 6/2006 | Luo | H04R 25/407 381/98 |
| 2007/0009127 A1 | 1/2007 | Klemenz et al. | |
| 2010/0082339 A1 | 4/2010 | Konchitsky et al. | |
| 2015/0055788 A1* | 2/2015 | Zakis | H04R 3/002 381/71.1 |

FOREIGN PATENT DOCUMENTS

| | | |
|---|---|---|
| EP | 1448016 A1 | 8/2004 |
| EP | 1519626 A2 | 3/2005 |
| EP | 2701145 A1 | 2/2014 |
| EP | 2765787 A1 | 8/2014 |
| EP | 3122072 A1 | 1/2017 |

* cited by examiner

*Primary Examiner* — Antim G Shah

(57) ABSTRACT

Disclosed herein are embodiments of a hearing aid with two or more microphones and a processor; wherein the processor includes a first filter bank, a beamformer, a multiplexer configured to perform multiplexing operations outputting time-frequency values, and a wind noise controller configured to, recurringly, determine a first wind noise level.

15 Claims, 8 Drawing Sheets

HEARING AID INCLUDING WIND NOISE REDUCTION

The present disclosure relates to a hearing aid performing wind noise reduction.

BACKGROUND

Conventional hearing aids are often configured with at least two microphones, one rear microphone and one front microphone, e.g., omnidirectional microphones, arranged to capture ambient sounds from the surroundings of the user of the hearing aid and coupled to a beamformer providing a directional output signal to an electro-acoustic output transducer. Additional one or more microphones may be provided to capture ambient sounds. Further, a frequency-specific gain stage and a compressor are included to provide compensation for the user's prescribed hearing loss.

The beamformer performs spatial filtering suppressing signals from other directions than from one or more target directions. Beamforming methods performed in hearing aids have proven to be very effective in suppressing noise from the surroundings.

However, beamformers may be less effective in suppressing wind noise. Wind noise occur as sounds created by turbulent winds at the microphones e.g., at inlets to microphones, which are picked up by each of the microphones. Due to the turbulent behaviour wind noise levels are likely different at different times. It is known that the wind noise may generate loud sound levels and that wind noise tend to be uncorrelated between microphones.

Importantly, in conventional hearing aids only a very limited battery power budget is available to keep the hearing aid(s) operating throughout a full day.

PRIOR ART

EP2765787-A1 discloses a hearing aid including two or more microphones, a beamformer and an effective wind-noise-reduction scheme employing a wind noise controller. The wind-noise-reduction scheme is based on dynamically selecting signal values with a lowest wind-noise level not only from among signals provided by the microphones, but also from a signal provided by the beamformer.

In some embodiments, a weighing scheme is applied to the signals to favour e.g., the beamformed signal in the dynamic selection. A considerable amount of wind noise can be removed by the disclosed wind-noise-reduction scheme.

EP1448016-A1 discloses a hearing aid for detecting the presence of wind noise in an array of microphones.

With respect to wind noise reduction in hearing aids it is experienced that the wind-noise-reduction scheme requires a significant amount of battery power. It is also experienced that dynamically selecting signal values with a lowest wind-noise level tends to disfavour the directional signal, which in turn produces distortion to a signal from a target direction at least in speech frequency bands (speech frequency channels). Weighing the directional signal favourably may provide some improvement, but there is a risk of introducing musical noise.

SUMMARY

There is provided:
A hearing aid with two or more microphones and a processor; wherein the processor comprises:

a first filter bank configured to generate first time-frequency values and second time-frequency values in multiple frequency channels based on signals from the two or more microphones;
a first beamformer configured to generate third time-frequency values, based on the first time-frequency values and the second time-frequency values;
a multiplexer configured to perform multiplexing operations outputting fourth time-frequency values from the third time-frequency values and one or more of the first time-frequency values and the second time-frequency values;
a first filter configured to perform first noise reduction based on filtering the fourth time-frequency values in accordance with recurringly determined noise gain values; and
a wind noise controller configured to, recurringly, determine a first wind noise level based on one or more of: the first values, the second values, and the third values, and to determine whether the first wind noise level satisfies a first criterion;

wherein the multiplexer is further configured to perform static selection outputting the fourth time-frequency values from one of the third time-frequency values, the first time-frequency values and the second time-frequency values;

wherein the wind noise controller is configured to:
change over operation of the multiplexer from performing multiplexing operations to perform static selection, in response a determination that the first wind noise level fails to satisfy the first criterion; and
change over the operation of the multiplexer from performing static selection to perform multiplexing operations, in response a determination that the first wind noise level satisfies the first criterion.

An advantage is that battery power consumption can be reduced at least at times when the multiplexer is not performing multiplexing operations but is rather performing static selection. From a power consumption perspective, multiplexing operations are consuming significantly more power than static selection. This is particularly true since multiplexing operations are suspended while static selection is performed.

For instance, wearing the hearing aid indoors, e.g., in an office environment or in a living room, only rarely exposes the hearing aid to any significant wind speeds which is reflected in a low first wind noise level. Thus, suspending the multiplexing at least temporarily and at least in the first frequency channel effectively saves a significant amount of battery power over a full day for most uses of a hearing aid. On the contrary, when outside and more likely exposed to wind, the multiplexing operations can be resumed to effectively reduce wind noise. The multiplexer may thereby serve to effectively reduce wind noise, which often occur as a strong signal, but not in multiple signals at the same time. Then again, at times when wind noise fails to be detected, power consuming multiplexing operations can be suspended at least until required again.

The multiplexer, when performing multiplexing operations, dynamically, per time-frequency bin, outputs values from one of the microphones or the beamformer in a multiplexed manner. Along the same token, values of the signals other than the one, e.g., having the lowest wind noise level in a particular time-frequency bin, are effectively blocked out since they are not passed through the multiplexer. On the contrary, when performing static selection one of the signals gets passed through the multiplexer without performing multiplexing operations and without running though multiplexing cycles.

Thus, at least in the first frequency channel, the multiplexing operations are suspended at times when static selection is performed, and static selection is suspended at times when multiplexing operations are performed.

In one example, the wind noise level may be indicative of wind noise for an uninterrupted period of e.g., 10 seconds wherein multiplexing operations may be performed at a rate of 1000 or 100 multiplexing cycles per second. Even if multiplexing cycles are performed at a rate as low as 10 cycles per second or lower, power consumption may be reduced. A multiplexing cycle includes selection from potentially, or typically, each of the microphone signals and the beamformed signal. Thus, a multiplexing cycle requires many selection operations e.g., in dependence of wind noise level estimate.

The multiplexer can be controlled to perform multiplexing operations or static selection, at least in a first frequency channel, based on determining that the first wind noise level satisfies or fails to satisfy the first criterion.

The multiplexing operations may be performed by the processor executing software instructions utilizing hardware resources at the processor. Suspending the multiplexing operations may be performed by forgoing executing the software instructions and/or switching to less power consuming software instructions.

Changing over the operation of the multiplexer from performing multiplexing operations to perform static selection, may include suspending multiplexing operations. Changing over the operation of the multiplexer from performing static selection to perform multiplexing operations, may include resuming multiplexing operations.

The first criterion may include a threshold value e.g., including a hysteresis with an upper threshold value and a lower threshold value. The first criterion may be satisfied when the first wind noise level exceeds the upper threshold and may fail 5 to be satisfied when the first wind noise level fails to exceed the lower threshold.

The noise gain values may be computed based on one or more of: the first values, the second values and the third values. The first filter generates the second processed signal based on the noise reduction filter values. An advantage is the provision of noise reduction filtering that supplements spatial filtering provided by the beamforming. In some respects, the first filtering unit performs filtering, to reduce noise, following the beamforming, i.e., based on the first processed signal. In some respects, the noise reduction filter values are computed adaptively e.g., based on autocorrelation of the third values or a signal output from the first noise reduction unit and based on cross-correlation between the third values and the fourth values. The noise reduction filter values may include one or more of noise gain values; filter coefficients of an Infinite Impulse Response, IIR, filter; and filter coefficients of a Finite Impulse Response, FIR, filter. The noise gain values may be represented in a frame in accordance with a time-frequency representation including one or noise gain values per time-frequency unit. The noise gain values may be represented in one frame at a time, wherein the noise gain values may vary, over time, from one frame to the next. The rate of change of the noise gain values may be controlled by filtering. At least in some embodiments, the beamformer and the multiplexer receives multiple input signals, whereas the first filter receives a single signal from the multiplexer. Each of the signals is represented at the multiple frequency channels.

In some examples the multiplexer is performing dynamic multiplexing at least at some physical orientations of the hearing aid, when the hearing aid, including the at least two microphones, is situated in a field of wind with wind speeds exceeding one or more wind speeds in the group comprising: about 2 meters per second, about 3 meters per second, and about 4 meters per second.

In some examples the multiplexer is performing static selection, at least at some physical orientations of the hearing aid, when the hearing aid, including the at least two microphones, is situated in a field of wind with wind speeds not exceeding one or more wind speeds in the group comprising: about 2 meters per second, about 3 meters per second, and about 4 meters per second.

There is also provided a hearing aid wherein the static selection includes statically selecting the third time-frequency values. An advantage is that the directional signal from the beamformer is given priority at times when wind noise is less likely to disturb the user wearing the hearing aid. Thus, in absence of detection of wind noise, the directional signal may be statically selected.

In some respects, the third time-frequency values remain statically selected for as long time as the first wind noise level fails to have satisfied the first criterion. In some respects, the static selection includes statically selecting the third time-frequency values at least in the first frequency channel or in multiple frequency channels e.g., in all frequency channels. At times when the statically selecting the third time-frequency values, the first and second time-frequency values do not pass through the multiplexer.

There is also provided a hearing aid wherein the multiplexing operations continue for as long time as the first wind noise level fails to satisfy the first criterion. An advantage is that wind noise reductions remain effective while wind noise continues to be detected.

In some respects, determining that the first criterion is satisfied or fails to be satisfied is performed at a relatively slow rate e.g., slower than one time per second, or faster than one time per second e.g., about 50 to 100 times per second, e.g., 500 times per second.

In some respects, the multiplexing operations include multiple multiplexing cycles, each multiplexing cycle selecting the values to output from among multiple input signals including the microphone signal and the beamformed, directional signal. The multiplexing cycles should be performed fast enough that the multiplexer is outputting the fourth values at the same rate as each of the microphone signals or the beamformed signal. In some respects, the multiplexer output frames including time-frequency values, at a frame rate about 1000 frames per second.

In some embodiments, the multiplexer is configured to, concurrently:
perform multiplexing operations in one or more first frequency channels; and
perform static selection in one or more second frequency channels not including the first frequency channels;
wherein the first frequency channels and/or the second frequency channels are recurringly determined based on a first wind noise level for at least one frequency channel.

An advantage is that the processor can perform wind noise reduction employing the multiplexer operations in one or more frequency channels while concurrently not employing the multiplexer operations in one or more other frequency channels. This, in turn provisions the hearing aid with a better trade-off between wind noise reduction and battery power saving.

In some embodiments the first wind noise level is determined for at least some of the first frequency channels and for at least some of the second frequency channels; and wherein determining whether the first wind noise level satisfies the first criterion or fails to satisfy the first criterion is determined for the at least some of the first frequency channels and for the at least some of the second frequency channels.

An advantage is that noise reduction, e.g., wind noise reduction, can be gradually expanded to include more frequency channels or be gradually narrowed to include only frequency channels with, e.g., significant or strong, wind noise levels.

An advantage is that power consumption can be lowered gradually to perform noise reduction to include only frequency channels with, e.g., significant or strong, wind noise levels. Thus, a graceful or at least gradual transition from fully active wind noise reduction in two or more frequency channels using the multiplexer operations in the two or more frequency channels, to reduced wind noise reduction not using the multiplexer operations is provided.

An advantage is that the multiplexing can be performed in the first frequency channels, while multiplexing in the second frequency channels is suspended or vice versa.

Thus, at least in some examples, the multiplexer may, concurrently, perform the multiplexing operations in the first frequency channels and perform the static selection in the second frequency channels. In other examples, the multiplexer may, concurrently, perform the static selection in the first frequency channel and perform the multiplexing in the second frequency channel. Further, the multiplexer may, concurrently, perform the static selection in the first frequency channel and perform the static selection in the second frequency channel. Still further, multiplexer may, concurrently, perform the multiplexing operations in the first frequency channel and perform the multiplexing operations in the second frequency channel. This provides for a very dynamic trade-off between wind noise reduction and power consumption reduction.

The operation of the multiplexer may thus change from performing multiplexing to perform static selection, the first frequency channels, in response a determination that the first wind noise level fails to satisfy the first criterion; and change over the operation of the multiplexer from performing static selection to perform multiplexing, in the second frequency channels, in response a determination that the first wind noise level satisfies the first criterion.

This solution is justified by the fact that wind affects low and high frequency channels differently, depending on the intensity of the wind. In some examples, for relatively low wind speeds up to about 4 m/s wind noise is not detected above 2 kHz, while for higher wind speeds, above 4 m/s wind noise is present across a wide spectrum of frequencies including frequencies above 2 KHz.

In some examples, the processor is configured to estimate a wind noise level for each of multiple frequency channels and, for each of the multiple frequency channels, compare the wind noise level with a respective threshold value to determine, for each of the multiple frequency channels, whether the multiplexing operations should be activated or not i.e., whether multiplexing operations or static selection should be employed. Thereby, the power-expensive multiplexing operations can be activated only in selected frequency channels. This guarantees a power consumption reduction.

This solution allows to save on power consumption e.g., because it allows to reduce the number of multiplexing operations when the wind is moderate to low. However, the main advantage is produced by the fact that when the wind is not too severe, the wind selection between front, rear microphone and directional signals does not occur in the frequency regions where speech is present and therefore no target distortion will be produced.

In some embodiments the first wind noise level is determined for at least some of the first frequency channels and for at least some of the second frequency channels based on mapping a determined first wind noise level for a first frequency channel to the at least some of the first frequency channels and the at least some of the second frequency channels.

An advantage is further power consumption reduction. At least in one example, a wind noise level needs to be estimated based on signals from one or more of the microphones and the beamformer only in one frequency channel, whereas wind noise levels for other frequency channels can be determined via the mapping e.g., stored in a look-up table. The mapping may be based on a relation between frequency channels and wind speeds e.g., based on information shown in FIG. 7 herein. In some examples, the wind noise level is estimated only in a few, e.g., two or more frequency channels, but not all frequency channels, whereas wind noise levels for other frequency channels are determined via the mapping.

In some examples, the first frequency channel is included in one or more lowermost bands of the multiple frequency channels. An advantage is that e.g., wind noise can be reliably detected in lowermost frequency channels e.g., in frequency channels below 0.5-1 KHz. An advantage is that the first signal level can be computed based on a first number of one or more of the multiple frequency channels, rather than at all or substantially all frequency channels; wherein the first number is lower than the number of multiple frequency channels. In some examples, the number of multiple frequency channels is a number between equal to or greater than 16 bands, whereas the first number of bands is less than or equal to 4 bands.

In some respects, the first criterion includes determining that the first signal level exceeds a first threshold value.

In some embodiments the processor is configured with a second filter, lowpass filtering the first wind noise level and outputting a filtered first wind noise level; and wherein the determination whether the first wind noise level satisfies the first criterion is based on the filtered first wind noise level.

An advantage is improved stability of a decision to change over the operation of the multiplexer from performing multiplexing to perform static selection or, vice versa, change over the operation of the multiplexer from performing static selection to perform multiplexing. This reduces undesired sound artefacts. In some aspects, the second filter may be an Infinite Impulse Response, IIR, filter e.g., a first order IIR filter.

In some embodiments the processor is configured to:
increase a first integrator value by a first value at a time when the first wind noise level satisfies a second criterion; and
decrease the first integrator value by a second value at a time when the first wind noise level fails to satisfy the second criterion; and
determine whether the first wind noise level satisfies the first criterion based on the first integrator value.

An advantage is improved stability of a decision to change over the operation of the multiplexer from performing multiplexing to perform static selection or, vice versa, change over the operation of the multiplexer from performing static selection to perform multiplexing. This reduces undesired sound artefacts.

The first criterion may include a threshold value e.g., including a hysteresis with an upper threshold value and a lower threshold value. The first criterion may be satisfied when the first wind noise level exceeds the upper threshold and may fail to be satisfied when the first wind noise level fails to exceed the lower threshold.

In some respects, the first integrator value is a positive value, and the second integrator value is a negative value e.g., the positive value has an absolute value which is greater than the absolute value of the negative value. An advantage is that wind noise reduction may be engaged (attack) with a shorter response time than wind noise reduction is disengaged (release). In some examples, the first integrator value and the second integrator value have the same magnitude or substantially the same magnitude.

In some respects, the second value is different from the first value. In some respects, the second value has a different absolute value than the absolute value of the first value. This enables e.g., activating the wind noise reduction performed by the multiplexer faster than deactivating the wind noise reduction or vice versa.

In some respects, the processor is configured with a first limit value and a second limit value limiting the integrator value to a range defined by the limit values.

There is also provided a hearing aid wherein the first integrator value is based on the first wind noise level, and/or wherein the second integrator value is based on the first wind noise level. An advantage is that wind noise reduction may be engaged (attacked) with a shorter response time at times when wind noise has a high level compared to when wind noise has a lower level. Also, wind noise reduction may be disengaged (released) faster when wind noise drops to a very lower level compared to when wind noise drops to only a slightly lower level. In some respects, the first integrator value is a function of the first wind noise level. In some respects, the function uses a mathematical expression and/or a lookup table.

In some embodiments the wind noise controller is configured to determine the first wind noise level, for one or more time-frequency bins, based on a magnitude of decorrelation between the first time-frequency values and the second time-frequency values.

In some aspects, the wind noise controller is configured to determine the first wind noise level, for one or more time-frequency bins, based on integration of a magnitude of decorrelation between the first time-frequency values and the second time-frequency values.

Thus, in some respects, the processor may include a decorrelation detector configured to output a signal indicative of a magnitude of decorrelation between the first time-frequency values and the second time-frequency values; an integrator configured to output an integrated signal corresponding with integration of the signal indicative of the magnitude of decorrelation; wherein the first wind noise level value is based on the integrated signal.

In some embodiments the processor is configured to:
  generate a third processed signal, including sixth values, using second beamforming based on the first values and the second values;
wherein the first beamforming is based on first beamformer weight values; and
wherein the second beamforming is based on second beamformer weight values;
wherein the second beamformer weight values have a smaller magnitude than the first beamformer weight values;
wherein determining which fourth values to select is based on the sixth values and at least two of the first values and the second values.

An advantage is that the second beamforming can provide a proxy for determining which fourth values to select.

When comparing the energy in the individual microphone signals and a directional signal the presence of similar levels of uncorrelated noise on the microphone signals, either from internal sources e.g., microphone noise or external ones e.g., some elements of reverberation, can act as a bias against the selection of the directional signal. This is because large beamformer weights can be required to generate directional signals which also results in amplification of uncorrelated noise. This amplification of uncorrelated noise in the directional signal increases its energy and makes it less likely to be selected. One method to address this is shown in FIG. 3: we can use another directional signal, with smaller beamformer weights and therefore less uncorrelated noise amplification, as a proxy for the directional signal with larger weights when generating the signal selection. This can improve stability and preserve directional properties in scenarios with low level external noises where uncorrelated noises can be a significant contribution to the signal energies.

In some embodiments the first filter is active in performing the first noise reduction at times when the static selection is performed and at times when the multiplexing operations are performed.

An advantage is that wind noise suppression operations can remain operative irrespective of multiplexing operations being performed or not. An advantage is that noise reduction, in addition to spatial noise reduction provided by the beamforming, is at least not entirely inactive at times when the first criterion is not satisfied. In some respects, the first noise reduction unit remains active or continues to be active at times when the hearing aid is 'on' and operational as a hearing aid in providing compensation for a hearing loss.

In some embodiments the noise gain values, above a first wind noise threshold value, apply progressively more noise reduction with increasing wind noise level values; and wherein the noise gain values are limited to apply a maximum noise suppression level at wind noise level value above a second wind noise threshold value.

An advantage is that wind noise suppression operations can remain operative while the multiplexing operations are suspended. The wind noise suppression operations can be enhanced when the multiplexing operations are executed e.g., resumed.

In some embodiments the noise gain values, below a first signal-to-noise threshold value, apply progressively more noise reduction with decreasing signal-to-noise level values; and wherein the noise gain values are limited to apply a maximum noise suppression level at signal-to-noise level values below a second signal-to-noise threshold value.

An advantage is that noise suppression operations, to preferentially suppress non-voice signals, can remain operative while the multiplexing operations are suspended.

In some embodiments the multiplexer is configured to select the fourth values, for each time-frequency bin, in accordance with selecting the first values, the second values, or the third values that have the lowest wind noise level in corresponding time-frequency bins.

An advantage is that loud wind noise signals can be effectively suppressed. However, the advantage may come at the cost of sacrificing the directional signal at least at time-frequency bins wherein wind noise appears stronger in the directional signal than in the microphone signals. A more pleasant user experience is thus provided at least at times when wind noise is detected.

In some embodiments the hearing aid comprises:
an envelope detector configured to lowpass filter an absolute value of each of the first values, the second values and the third values and to output respective first envelope values, second envelope values, and third envelope values;
wherein the multiplexer is configured to select the fourth values, for each time-frequency bin, in accordance with selecting the first values, the second values, or the third values that have the lowest level in corresponding first envelope values, second envelope values, or third envelope values.

An advantage is improved stability of a decision to change over the operation of the multiplexer from performing multiplexing to perform static selection or, vice versa, change over the operation of the multiplexer from performing static selection to perform multiplexing. This reduces undesired sound artefacts. The envelope values are used as a proxy for deciding which of the signals to output from the multiplexer at a given time and frequency.

There is also provided a hearing aid, wherein the first time-frequency values and the second time-frequency values are contained in frames generated at a frame rate; and wherein the multiplexer performs multiplexing operations at a rate slower than the frame rate. An advantage is that power consumption can be reduced while the processor keeps performing wind noise reduction based on the multiplexing operations.

There is also provided a hearing aid, wherein one or more of the first values, the second values, and the third values are included in a time-frequency representation including a sequence of frames, wherein each frame includes time-frequency units each including multiple time-frequency values; wherein each time-frequency unit is associated with a time segment and at least one frequency channel among multiple frequency channels, including at least the first frequency channel. An advantage is that each of the frames include a time-frequency representation that is expedient for performing one or both of noise reduction and beamforming.

The first values and the second values included in the first frames and the second frames, respectively, can be generated by an analysis filter bank. An example of an analysis filter bank is disclosed in EP3122072A1 (assigned on its face to Oticon). The beamforming may be based on the first values and the second values included in the first frames and the second frames.

Alternatively, the first values and the second values included in the first frames and the second frames, respectively, can be generated by performing a short-time Fourier transform (STFT) as it is known in the art. The short-time Fourier transform may be performed by a signal processor e.g., a signal processor with circuitry dedicated to performing short-time Fourier transform operations efficiently.

Each frame may be designated by an index 'i'. A frequency channel may be designated by an index 'k' and a time segment may be designated by an index 'm', wherein 'i', 'k', and 'm' are integers. Thus, i(k,m) designates the k'th frequency channel and the m'th time segment of the i'th frame. The time-frequency values may be real numbers or complex numbers.

In some respects, the each of the first values, the second values, and the third values are included in the time-frequency representation.

In some respects, the first values, the second values, and the third values are included in respective first frames, second frames, and third frames; wherein each frame includes values for multiple time segments and for multiple frequency channels including at least the first frequency channel.

In some embodiments the hearing aid comprises:
an output transducer; and
a second filter bank configured to generate a generate a time-domain signal for the transducer based on a signal from the first filter.

Whereas the first filter bank may be configured as an analysis filter bank, the second filter bank may be configured as a synthesis filter bank.

There is also provided a pair of binaural hearing aids comprising a first hearing aid configured as set out in any of the embodiments above; and a second hearing aid;
wherein the first hearing aid and the second hearing aid are configured for wireless communication; and
wherein the first hearing aid is configured to communicate the first wind noise level to the second hearing aid.

An advantage is that the wind detector can be dispensed with in the second hearing aid. In particular, wind noise detection may be based on a local decision at each instrument or a joint decision between the first hearing aid and the second hearing aid.

In some respects, the first wind noise level is determined by only one of the first hearing and the second hearing aid, wherein the first wind noise level is communicated from the only one hearing aid to the other hearing aid. Thereby, computational power associated with determining the first wind noise level in one of the hearing aids can be reduced or forgone.

The embodiments disclosed herein related to improved stability, are especially relevant in connection with binaural hearing aids configured to communicate the first wind noise level to the second hearing aid in the pair of binaural hearing aids.

BRIEF DESCRIPTION OF THE FIGURES

A more detailed description follows below with reference to the drawing, in which.

DETAILED DESCRIPTION

Figure 1:
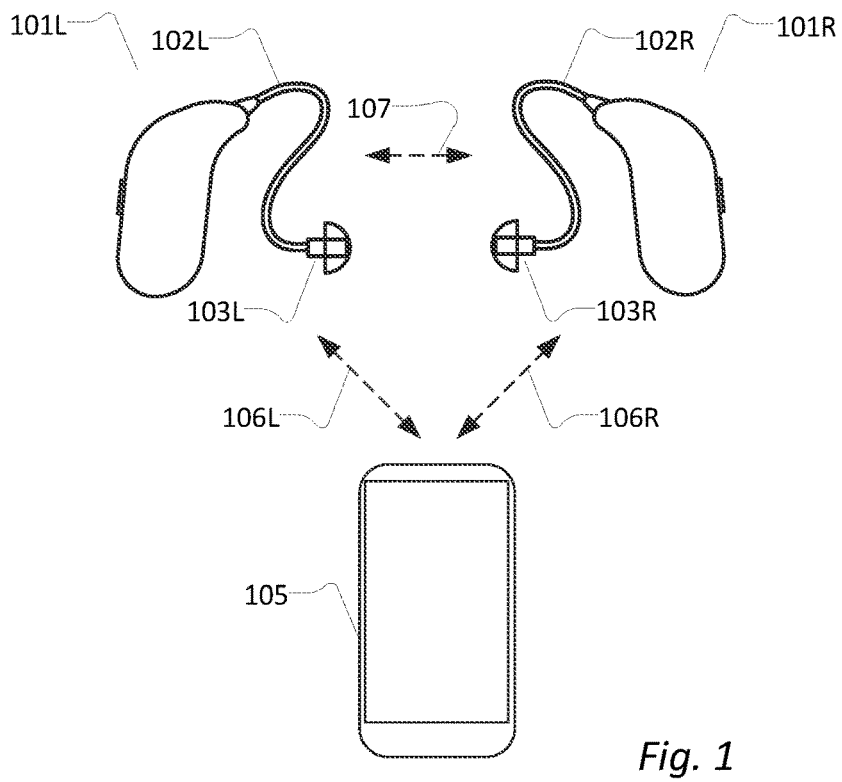
FIG. 1 shows a pair of hearing aids in a hearing aid system.

FIG. 1 shows an illustration of hearing aids and an electronic device. The electronic device 105 may be a smartphone or another electronic device capable of short-range wireless communication with the hearing aids 101L and 101R via wireless links 106L and 106R. The electronic device 105 may alternatively be a tablet computer, a laptop computer, a remote wireless microphone, a TV-box interfacing the hearing aids with a television or another electronic device.

The hearing aids 101L and 101R are configured to be worn behind the user's ears and comprises a behind-the-ear part and an in-the-ear part 103L and 103R.

The behind-the-ear parts are connected to the in-the-ear parts via connecting members 102L and 102R. However, the hearing aids may be configured in other ways e.g., as completely-in-the-ear hearing aids. In some examples, the electronic device is in communication with only one hearing aid e.g., in situations wherein the user has a hearing loss requiring a hearing aid at only one ear rather than at both ears. In some examples, the hearing aids 101L and 101R are in communication via another short-range wireless link 107, e.g., an inductive wireless link.

The short-range wireless communication may be in accordance with Bluetooth communication e.g., Bluetooth low energy communication or another type of short-range wireless communication. Bluetooth is a family of wireless communication technologies typically used for short-range communication. The Bluetooth family encompasses 'Classic Bluetooth' as well as 'Bluetooth Low Energy' (sometimes referred to as "BLE").

Figure 2:
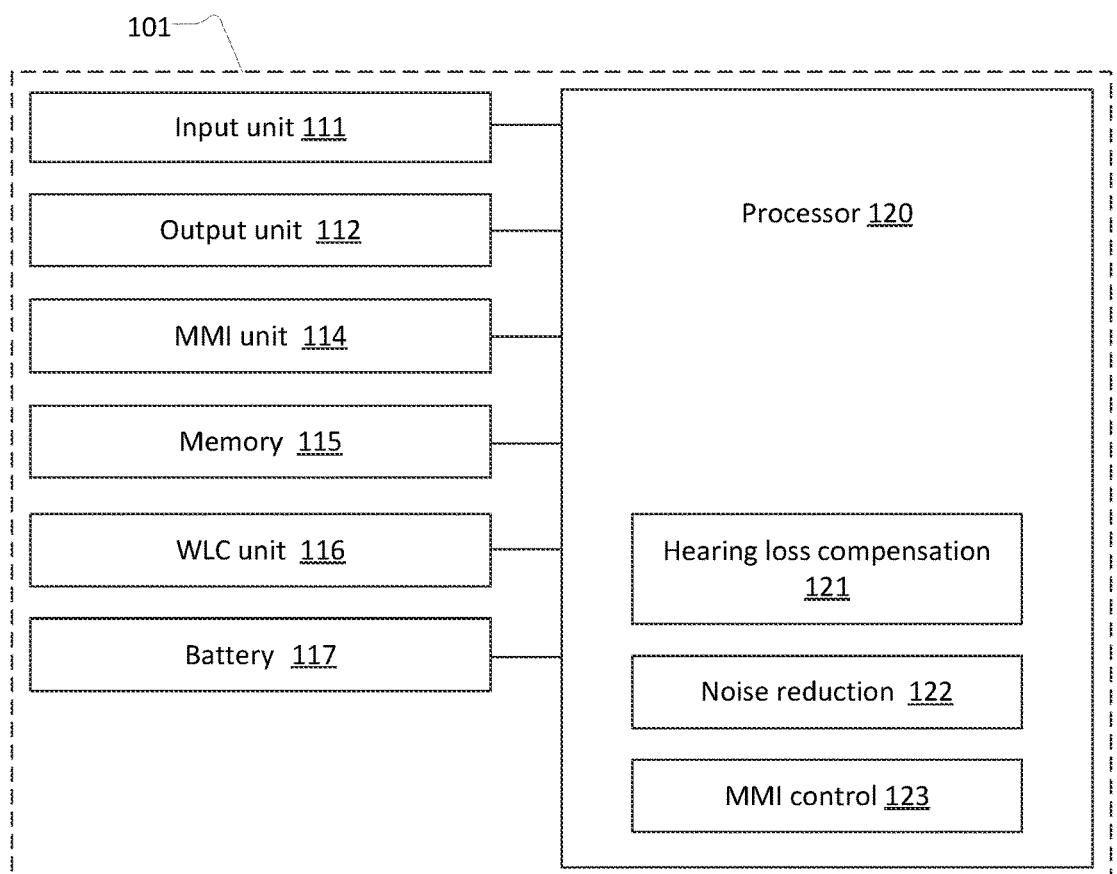
FIG. 2 shows a block diagram of a hearing aid.

FIG. 2 shows a first block diagram of a hearing aid. The hearing aid 101 comprises an input unit 111, an output unit 112, a man-machine interface unit MMI, 114, a memory 115, a wireless communication unit (WLC unit) 116, a battery 117 and a processor 120. The battery may be a single-use battery or a rechargeable battery. The processor 120 may comprise a unit 121 configured to perform hearing loss compensation, a unit 122 configured to perform noise reduction, and a unit (MMI control) 123 for controlling man-machine interfacing.

The input unit 111 is configured to generate an input signal representing sound. The input unit may comprise an input transducer, e.g., one or more microphones, for converting an input sound to the input signal. The input unit 111 may include e.g., two or three external microphones configured to capture an ambient sound signal and an in-ear microphone capturing a sound signal in a space between the tympanic member (the eardrum) and a portion of the hearing aid. Additionally, the input unit may comprise a wireless receiver for receiving a wireless signal comprising or representing sound and for providing the signal representing sound. The microphones and/or the processor may include one or more analogue-to-digital converters (not shown). The processor is preferably configured for digital signal processing of the input signals.

The output unit 112 may comprise an output transducer. The output transducer may comprise a loudspeaker (sometimes denoted a receiver) for providing an acoustic signal to the user of the hearing aid. The output unit may, additionally or alternatively, comprise a transmitter for transmitting sound picked up by the hearing aid to another device.

One or both of the input unit 111 and the noise reduction unit 122 may be configured as a directional system. The directional system is adapted to spatially filter sounds from the surroundings of the user wearing the hearing aid, and thereby enhancing sounds from an acoustic target source (e.g., a speaking person) among a multitude of acoustic sources in the surroundings of the user. The directional system may be adapted to detect, e.g., adaptively detect, from which direction a particular part of the microphone signal originates. This can be achieved in different ways as described e.g., in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The man-machine interface unit 114 may comprise one or more hardware elements, e.g., one or more buttons, one or more accelerometers and one or more microphones, to detect user interaction.

In some embodiments the hearing aid includes an accelerometer or another type of motion sensor; wherein the processor is configured to detect a movement and/or a movement type, associated with a movement performed by the wearer of the hearing aid, based on a signal from the accelerometer or motion sensor; wherein multiplexing operations are engaged in response to detection of a movement and/or a movement type. In some respects, the movement includes a movement exceeding a movement intensity threshold. Examples of movement types are walking e.g., brisk walking, running, and bicycling.

The wireless communication unit 116 may include a short-range wireless radio e.g., including a controller in communication with the processor.

The processor may be configured with a signal processing path receiving audio data via the input unit with one or more microphones and/or via a radio unit; processing the audio data to compensate for a hearing loss; and rendering processed audio data via an output unit e.g., comprising a loudspeaker. The signal processing path may comprise one or more control paths and one or more feedback paths. The signal processing path may comprise a multitude of signal processing stages.

Figure 3:
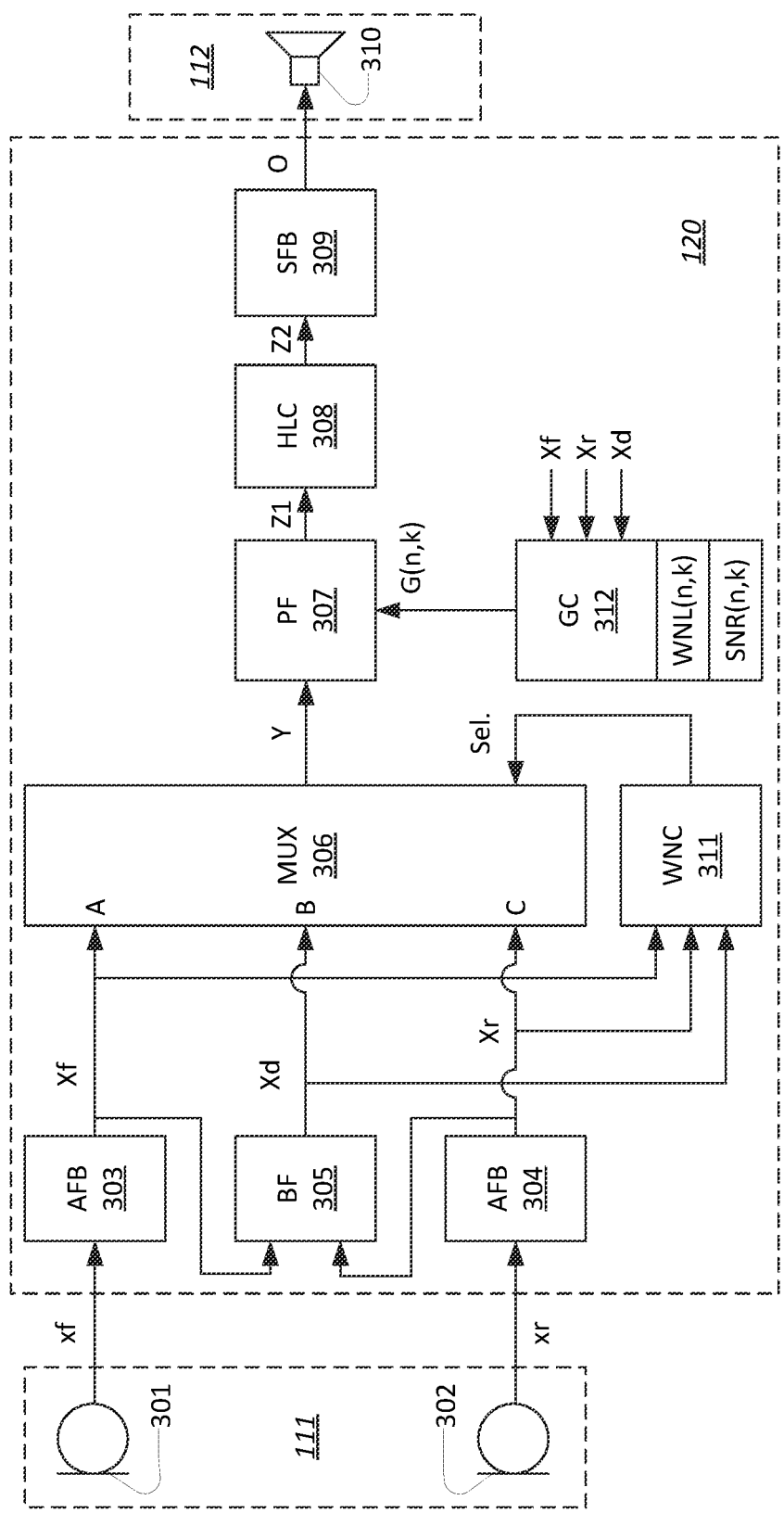
FIG. 3 shows a block diagram of hearing aid processor coupled to microphones and an output transducer.

FIG. 3 shows a block diagram of hearing aid processor coupled to the input unit and an output transducer. The hearing aid processor 120 is coupled to receive signals from the input unit 111 and to output a signal to the output unit 112. The input unit 111 includes a first microphone 301 and a second microphone 302 configured to output respective signals xf and xr. The first microphone may be arranged as a so-called front microphone in the hearing aid and the second microphone may be arranged as a so-called rear microphone in the hearing aid. The output unit 112 includes a loudspeaker 310.

The processor 120 includes an analysis filter bank AFB, 303; 304 decomposing the input signals xr, xf into multiple frequency channels each with band-limited signals, e.g., so-called time-frequency signals Xf and Xr in a time-frequency representation. The time-frequency signals may include a sequency of frames, wherein each frame includes time-frequency bins $Xf(n,k)$, wherein n is a time index and k is a frequency channel index. In some embodiments the analysis filter bank AFB, 303; 304 performs Fast Fourier Transformations, FFT. In some embodiments the analysis filter bank AFB, 303; 304 is implemented by multiple band-pass filters. In some embodiments the analysis filter bank decomposes the input signals into the multiple frequency channels in such a way that the input signal can be reconstructed e.g., perfectly reconstructed, e.g., without colouring the reconstructed signal relative to the input signal. Reconstruction may include summing signals in the multiple frequency channels. Reconstruction may include filtering. A time-frequency bin may include one or more samples.

The processor 120 includes a beamformer 305, which receives the time-frequency signals Xf and Xr and outputs a time-frequency signal Xd, which is a directional signal, whereas the signals Xf and Xr may be e.g., omnidirectional signals. In some embodiments the beamformer 305 is a Minimum Variance Distortion-less (MVDR) beamformer. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The processor 120 includes a multiplexer 306. The multiplexer 306 operates with a wind noise controller, WNC, 311, at least at a first frequency channel, to perform one of static selection and multiplexing. The multiplexer receives the signal Xf at a first input, A; the signal Xd at a second input B; and the signal Xr at a third input C and outputs a signal, Y, in response to a selector signal, Sel. The multiplexer 306, the wind noise controller, WNC, 311, and the selector signal, Sel., are configured to compose the signal, Y, by multiplexing operations from time-frequency bins included in the time frequency signals Xr, Xd, Xr e.g., in accordance with a minimum power or minimum magnitude criterion enabling selecting as follows:

$$Y(n = n1, k = k1) = \min_{A,B,C}(|A(n1, k1)|, |B(n1, k1)|, |C(n1, k1)|)$$

Wherein n is a time-index, and k is a frequency-channel index. Thus, the signal, Y, includes time-frequency bins each with values from a corresponding time-frequency bin having the lowest wind noise level among the correspond time-frequency bins at the inputs A, B, and C. In some embodiments the multiplexer has two inputs, three inputs, four inputs, five inputs or more inputs.

Since the multiplexing operations consume a significant amount of battery power, the processor change over the operation of the multiplexer from performing multiplexing operations to perform static selection, in accordance with a determination that the wind noise level is below a threshold wind noise level. On the contrary, in response to a determination that the wind noise level exceeds the threshold wind noise level, the processor changes over the operation of the multiplexer from performing static selection to perform multiplexing operations. In this way, battery power consumption reduction is enabled, while enabling effective wind noise reduction. As will be described in more detail herein, embodiments are provided to increase stability of multiplexing operations and increase stability of the change-over between performing multiplexing operations and static selection. Further, embodiments are provided to provide static selection in some frequency channels while performing multiplexing operations in other frequency channels.

The signal Y is supplied to a post filter, PF, 307 which provides single-channel filtering of the multiplexed signal, Y, based on a gain factor G(n,k) for each time-frequency bin. The gain factor G(n,k) is determined based on a determined signal-to-noise ratio SNR(n,k) and a determined wind noise level, WNL(n,k). The signal-to-noise ratio SNR(n,k) and the wind noise level, WNL(n,k) may be determined based on one or more of the time-frequency signals, Xf, Xr, Xd. This is explained in further detail herein. The post filter 307 outputs a filtered signal Z1. In some embodiments the postfilter is a single channel postfilter. The gain factor G(n,k) is determined by a gain computer 312, which determines a wind noise level value, WNL, and a signal-to-noise value, SNR for each time-frequency bin (n,k).

The processor 120 includes a hearing loss compensator, HLC, 308 configured to perform compensation for a pre-scribed hearing loss. The hearing loss compensator 308 receives the filtered signal Z1 and outputs a signal Z2 in accordance with a hearing loss prescription e.g., based on an audiogram. The hearing loss compensator 308 may include one or both of a compressor and a frequency dependent gain compensator.

The processor includes a synthesis filter bank SFB, 309 configured to output a time-domain signal to the output unit 112 for the loudspeaker 310. The synthesis filter bank synthesizes the time-domain signal based on time-frequency signal Z2. Thus, the synthesis filter bank reconstructs a time-domain signal. In some embodiments each of the signals Xf, Xd, Xr; Y, Z1 and Z2 is a time-frequency signal.

In some embodiments, the wind noise controller 311 is included in the multiplexer 306. In some embodiments, the wind noise controller 311 determines wind noise levels, whereas the multiplexer 306 determines which input to include in the output e.g., based on a least wind noise level criterion.

In some embodiments, inputs to the multiplexer includes two or more directional signals generated by e.g., one, two or more beamformers. In some embodiments, inputs to the multiplexer includes one or more microphone signals and two or more directional signals generated by e.g., one, two or more beamformers.

The processor 120 is coupled to a battery, e.g., a rechargeable battery, via one or more DC-DC converters (not shown).

In some embodiments the input unit includes more than two microphones e.g., 3 or 4 microphones. The microphones are arranged to capture sound from the surroundings of the user. The microphones do not include one or more so-called in-ear or inwards-facing microphones arranged to capture sound from the ear canal of the user. The processor is configured accordingly to process the signals from the two, three, four or higher number of microphones.

In some embodiments the output unit includes more than one loudspeaker, e.g., two loudspeakers designated to different, e.g., overlapping, frequency bands.

Figure 4:
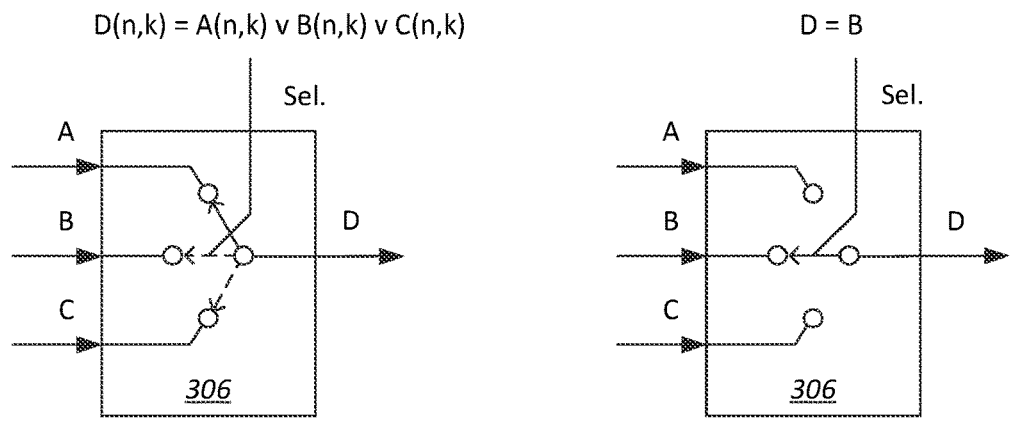
FIG. 4 shows a detail of the multiplexer.

FIG. 4 shows a detail of the multiplexer. The multiplexer 306 receives at inputs A, B and C time-frequency signals e.g., including frames with time-frequency bins indexed (n,k), wherein n is a time index and k is a frequency channel index.

On the left-hand side, the multiplexer 306 performs multiplexing operations synthesizing frames at output D. Each time-frequency bin at the output D e.g., at index (n1, k1) is selected from a corresponding bin indexed (n1, k1) at one of inputs A, B or C. Thus, at least in one example, the multiplexer synthesizes an output frame by individual selection from one of the inputs bin-by-bin in accordance with a selector signal, Sel. Thus, the multiplexer performs dynamic multiplexing in accordance with the selector signal, Sel.

On the right-hand side, the multiplexer 306 performs static selection e.g., statically selecting the signal at input B, which may be the directional signal, Xd, from the beamformer 305. The signal at output D may be a copy of the signal at one of the inputs, e.g., at input B. The signal at output D may be routed directly from one of the inputs, e.g., at input B, without obtaining a copy of the signal. Thus, static selection requires much lower power consumption than multiplexing operations.

Figure 5:
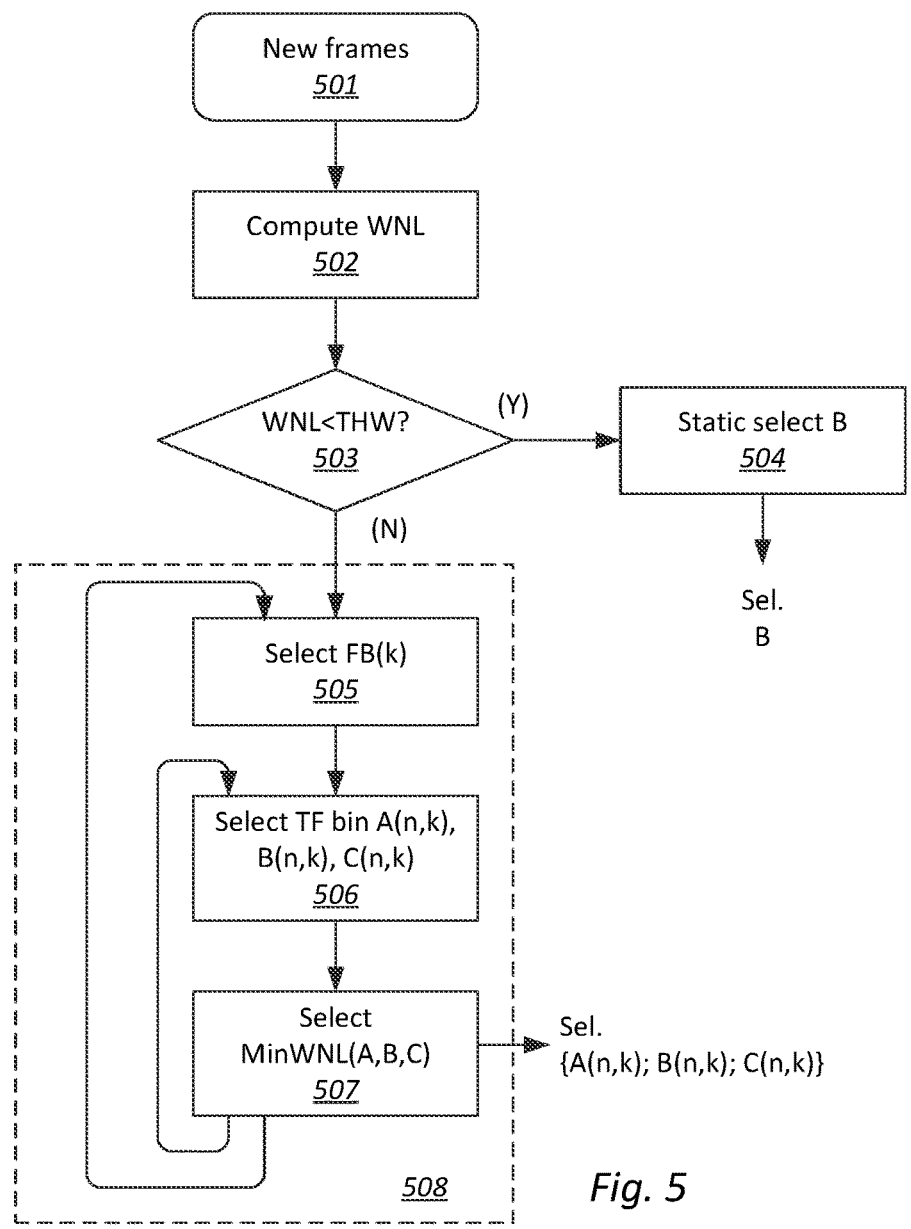
FIG. 5 shows a first flowchart for controlling the multiplexer.

FIG. 5 shows a first flowchart for a method of controlling the multiplexer. The multiplexer may be controlled via the selector signal, Sel., generated by the wind noise controller 311. At step 501 a set of new frames is received e.g., each frame comprising N-by-K bins. New set of frames arrives recurringly, e.g., including frames at a frame rate, from the analysis filter bank and the beamformer. The method commences each time a new set of frames arrives.

At step 502 a wind noise level, WNL, is determined, at least for a first frequency channel, based on one or more of the signals Xf, Xd and Xr. The wind noise level may be determined as a single value for a full frame, or it may be determined as a value for each or one or more of the K frequency channels.

At step 503 it is determined whether the wind noise level, WNL, satisfies a first criterion, e.g., including that the wind noise level does not exceed a threshold wind noise level, THW. If the threshold is not exceeded (Y), the output of the multiplexer is statically selected to correspond with one of the inputs, e.g., input B. In this situation, power consumption can be significantly reduced.

On the contrary, if the threshold is not exceeded (N), the output of the multiplexer is generated by multiplexing operations 508 synthesizing a frame including, at each bin, signal values from a corresponding bin at one of the inputs A, B or C. The selector signal, Sel., for the multiplexer may be generated by firstly looping across the frequency bins FB indexed by K, selecting a respective frequency channel in step 505. Then, for a respective frequency channel, secondly looping across the N time bins indexed by n. Step 506 selects the bins at each input of the multiplexer i.e., A(n,k), B(n,k), C(n,k) and step 507 selects the bin having the least wind noise level at (n,k). The selector signal, Sel., may include the indexes (n,k) and at least an indication of the selected signal at input A, B or C. Other implementations of the multiplexing operations are possible. It can be observed that the multiplexing requires one or more comparisons at each bin. This is power consuming.

In some embodiments the multiplexing operations include looping over frequency channels from uppermost frequency channels (at higher frequencies) to lowermost frequency channels (at lower frequencies). Alternatively, looping over frequency channels from lowermost frequency channels to uppermost frequency channels. However, the multiplexing operations may include parallel or concurrent processing at least for some frequency channels.

Thus, the wind noise controller 311 recurringly determines a first wind noise level based on one or more of the signals input to the multiplexer or another signal obtained via the microphones and determines whether the first wind noise level satisfies a first criterion. This determination may be performed at the frame rate or slower as mentioned herein. Accordingly, the wind noise controller is configured to change over operation of the multiplexer from performing multiplexing operations to perform static selection, or change over the operation of the multiplexer from performing static selection to perform multiplexing operations at the frame rate or slower however in response a determination that the first wind noise level fails to satisfy or satisfied the first criterion. This may also apply in connection with the method described below in connection with the second flowchart in FIG. 6.

Figure 6:
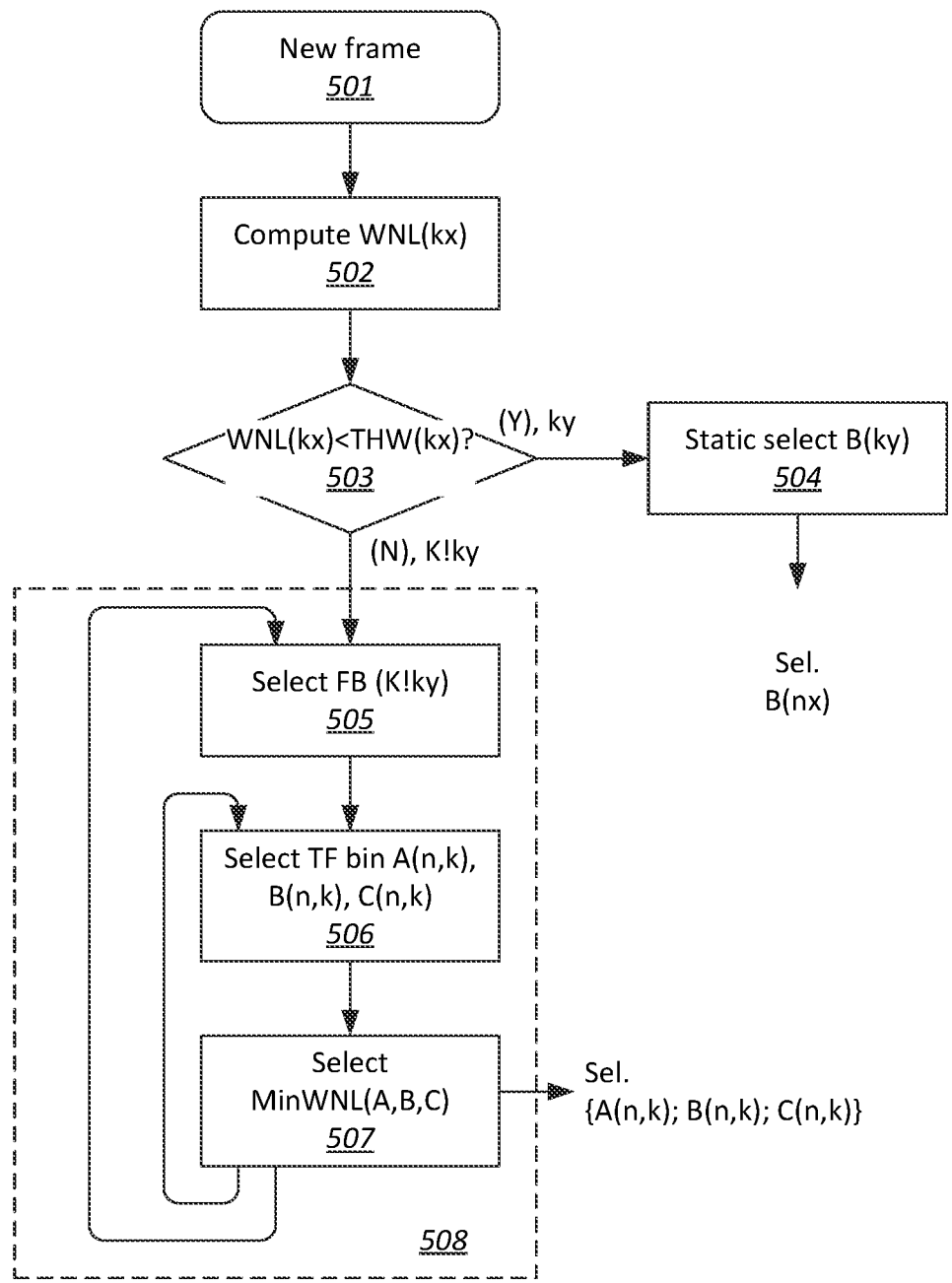
FIG. 6 shows a second flowchart for control of the multiplexer.

FIG. 6 shows a second flowchart for a method of controlling the multiplexer. Again, at step 501 new frames are recurringly received e.g., each comprising N-by-K bins. At step 502 a wind noise level, WNL, is determined for each or at least for multiple frequency channels, kx, including a first frequency channel, based on one or more of the signals Xf, Xd and Xr. Here, kx designates a list or range of indexes of frequency channels. In some examples, kx designates one or more frequency channels for which a wind noise level is determined. In some examples, the analysis filter bank generates e.g., 64 frequency channels, and kx includes the index of all 64 frequency channels or a subset thereof e.g., only frequency channels at lowermost frequencies. There may be e.g., 32, 64 or another number of K frequency channels. In some examples, the wind noise level is determined as an aggregated, e.g., average, value for multiple neighbouring frequency channels. The wind noise level may be determined as a value for each or at least multiple of the K frequency channels.

At step 503 it is determined whether the wind noise levels, WNL for the frequency channels kx, each satisfies a first criterion, e.g., including that the wind noise level does not exceed a threshold wind noise level, THW(kx). If the threshold is not exceeded (Y), i.e., WNL(kx)<THW(kx), the output of the multiplexer is statically selected to correspond with one of the inputs, e.g., input B. Here, THW(kx) is a threshold, which is specific for a frequency channel included in kx. The specific thresholds may be equal or different. In some examples, WNL(kx) is represented by a single value. In this embodiment, ky designates the frequency channels at which the wind noise level did not exceed the threshold. Thus, static selection is applied at the one or more frequency channels represented by ky, if any. In some examples, the signal at output D from the multiplexer is a copy of the signal at input B only at the frequency channels represented by ky. In this situation, power consumption can be significantly reduced since multiplexing is not performed at the ky frequency channels, rather static selection is performed at the ky frequency channels.

On the contrary, at the group of remaining frequency channels kx!ky (i.e., excluding the ky frequency channels), for which the threshold(s) THW(kx) is/are not exceeded (N), the output of the multiplexer is generated by multiplexing operations 508. Thus, a frame is synthesized at frequency channels ky by static selection and by multiplexing at the remaining frequency channels kx!ky.

The multiplexer shown in FIG. 4 can thus perform multiplexing operations in some frequency channels, while, concurrently, static selection is performed in other frequency channels. This may greatly improve the trade-off between power consumption reduction and wind noise reduction.

In some embodiments computing the wind noise level, WNL, for the frequency channels, kx, in step 502 may include looping over the frequency channels, kx, from uppermost frequency channels (at higher frequencies) to lowermost frequency channels (at lower frequencies). Alternatively, looping over frequency channels from lowermost frequency channels to uppermost frequency channels. However, computing the wind noise level, WNL, at different frequency channels may include computing the wind noise levels in parallel or concurrently at least for some frequency channels. In some embodiments, including looping over the frequency channels, kx, from uppermost frequency channels to lowermost frequency channels, determining that the wind noise level exceeds the threshold wind noise level may serve as an early stopping criterion whereby it is automatically determined that the threshold is exceeded for each of the remaining (lowermost) frequency channels. Thereby battery power consumption can be reduced cf. e.g., FIG. 7.

Figure 7:
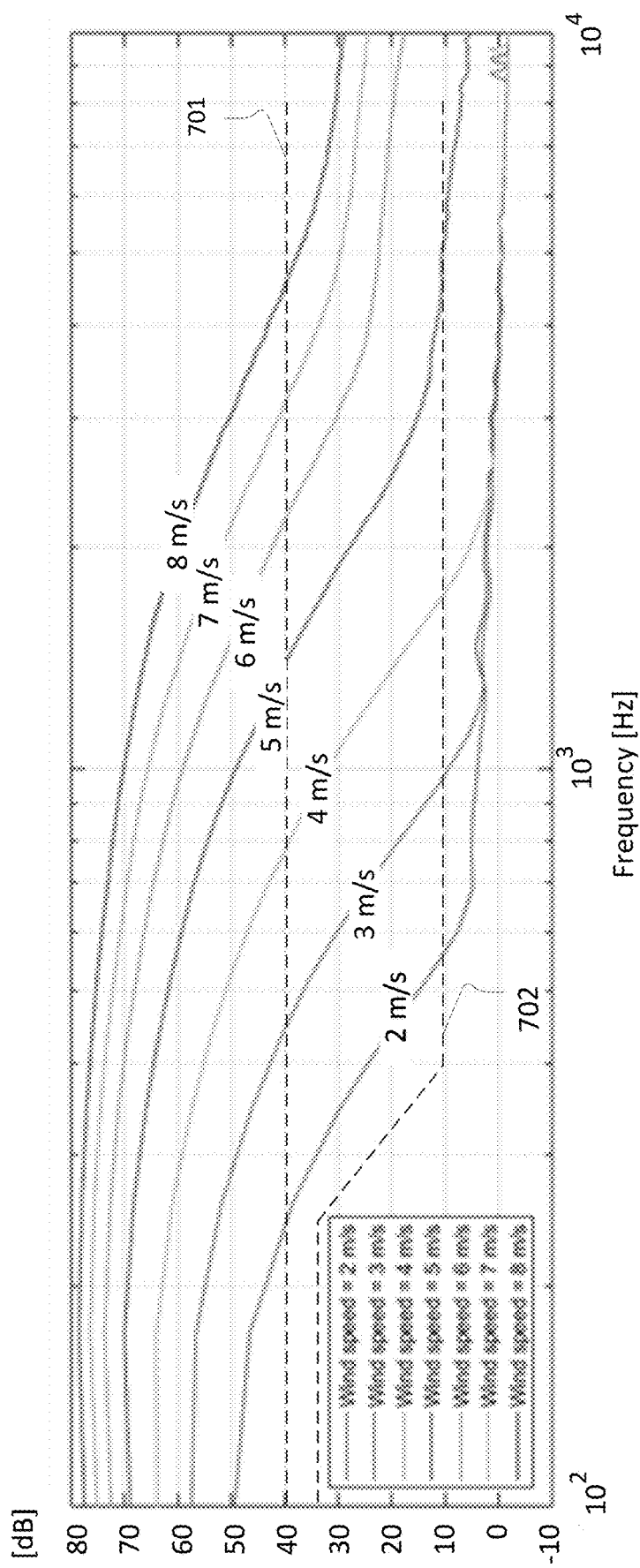
FIG. 7 shows wind noise levels as a function of frequency at different wind speeds.

FIG. 7 shows wind noise levels as a function of frequency at different wind speeds. A band of curves includes a lowermost curve for a windspeed of about 2 m/s and an uppermost curve for a windspeed of about 8 m/s. The curves in between are for windspeeds at 3, 4, 5, 6 and 7 m/s.

In connection with the embodiment of FIG. 6 multiplexing operations can thus be performed only for frequency channels at which wind noise is detected. If the wind picks up, gradually more frequency channels can be included for multiplexing operations. Other, frequency channels e.g., at higher frequencies can thus be processed using static selection.

In an example, the threshold wind noise level is represented by the dashed line 701, which has the same value at all frequency channels.

In another example, the threshold wind noise level is represented by the dashed curve 702, which includes different values at different frequency channels e.g., including two or more different values.

Figure 8:
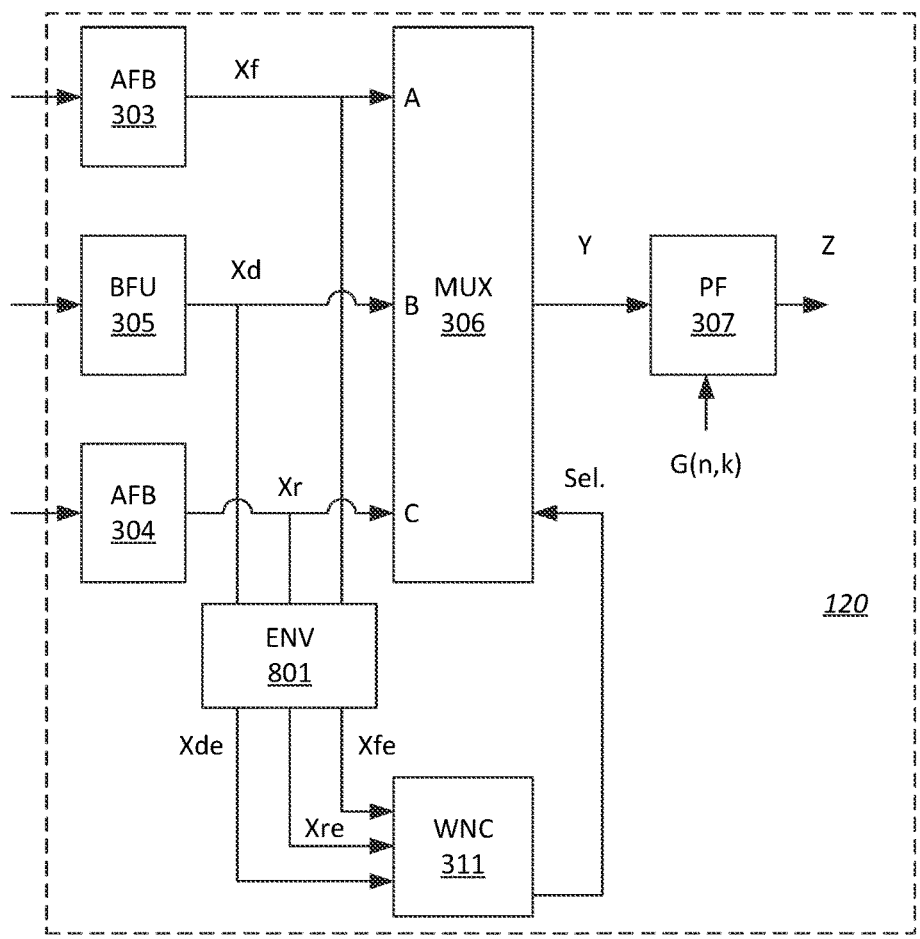
FIG. 8 shows a detail of the processor including an envelope detector.

FIG. 8 shows a detail of the processor including an envelope detector. As mentioned above, while multiplexing operations are carried out, at least in one or more frequency channels, the wind noise controller 311 selects the time-frequency bin with the least level of wind noise. To improve stability of the decision about which input to select, an envelope detector 801 provides less-fluctuating signals Xfe, Xde, Xre based on signals Xf, Xd, and Xr, respectively. It is thereby enabled that the wind noise controller 311 can determine the least wind noise level in a more stable manner. Thus, rather than using an instantaneous value to decide which input signal (bin) that has the least wind noise level, the envelope detector provides a more stable signal for making the decision regarding which input signal that has the least wind noise level. The envelope detector may be configured to lowpass filter the absolute value (magnitude) of the input signals, Xf, Xd, Xr. Alternatively, the envelope detector may be configured to lowpass filter the squared value of the input signals, Xf, Xd, Xr. The lowpass filter may include an Infinite Impulse Response, IIR, filter e.g., a $1^{st}$ order IIR filter. Other types of lowpass filter may be applied.

Figure 9:
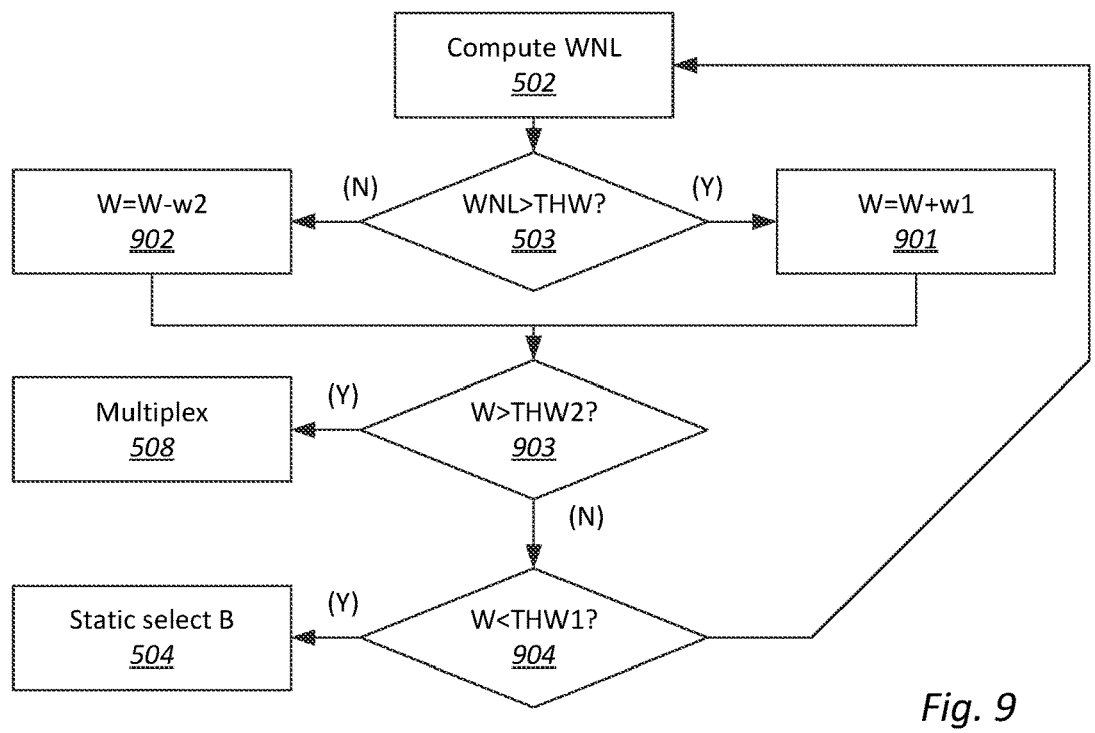
FIG. 9 shows a flowchart applying a stability measure.

FIG. 9 shows a flowchart for applying a stability measure. The stability measure may be implemented by the wind noise controller 311 in connection with step 503 in FIG. 5 or 6.

Step 503 makes the decision to either perform multiplexing operations or perform static selection. To stabilize the decision, the stability measure includes an integrator value W that is increased in step 901 in response to detection of wind noise exceeding the threshold wind noise level, THW—and correspondingly, W is decreased in step 902 in response to detection of wind noise failing to exceed the threshold wind noise level THW. Subsequently, in step 903 it is determined whether the integrator value W has reached an upper threshold value THW2. If the upper threshold THW2 is reached (Y), the multiplexer performs the multiplexing operations in step 508. Alternatively, if W did not reach the upper threshold THW2 (N), it is determined, in step 904, whether the integrator value W has instead reached a lower threshold value THW1. If the lower threshold THW1 is reached (Y), the multiplexer performs static selection in step 504.

In embodiments performing static selection and multiplexing operations based on individual decisions in different frequency channels, there may be provided an integrator value, W, for each of the frequency channels, and they are each updated individually.

The integrator value, W, may be increased by an absolute w1 and may be decreased by an absolute value w2. The values w1 and w3 may be constant values e.g., different values. In some examples, the values of one or both of w1 and w2 are determined based on the wind noise level.

Figure 10:
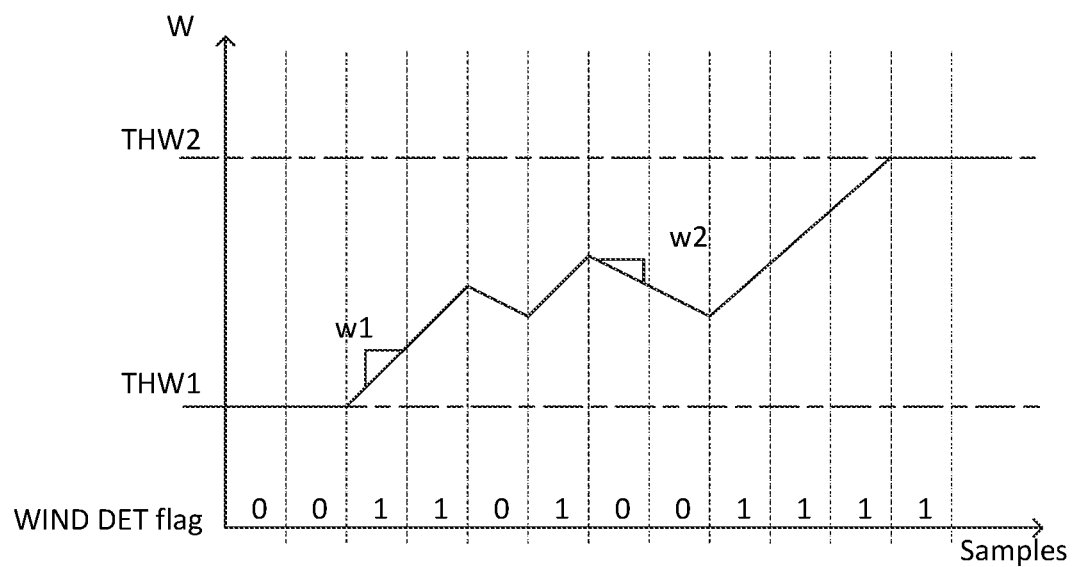
FIG. 10 illustrates progress of the stability measure in one example.

FIG. 10 illustrates progress of the stability measure in one example. The integrator value may be limited to not exceed an upper value Wmax and a lower value Wmin. A binary value, WIND DET flag, indicates whether wind noise level, WNL, exceeds the threshold wind noise level, THW.

Figure 11:
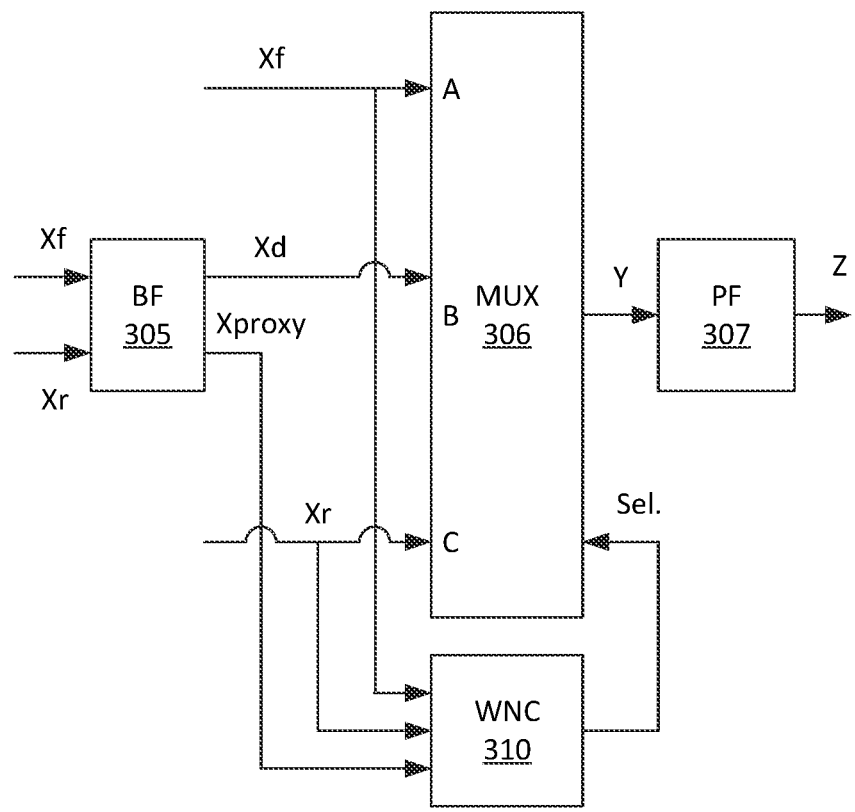
FIG. 11 shows a detail of the processor including a beamformer with a proxy output.

FIG. 11 shows a detail of the processor including a beamformer with a proxy output. In this embodiment, the beamformer 305 generates an additional directional, Xproxy, signal based on beamformer weight values that are scaled to generally lower values than the beamformer weight values on which the directional signal, Xd, is based. Thereby the additional directional signal, Xproxy, provides a proxy for the wind noise controller 310 determining which input signal to include in the output from the multiplexer based on the additional directional signal, Xproxy. This may favour selection of the directional signal over any of the microphone signals.

Figure 12:
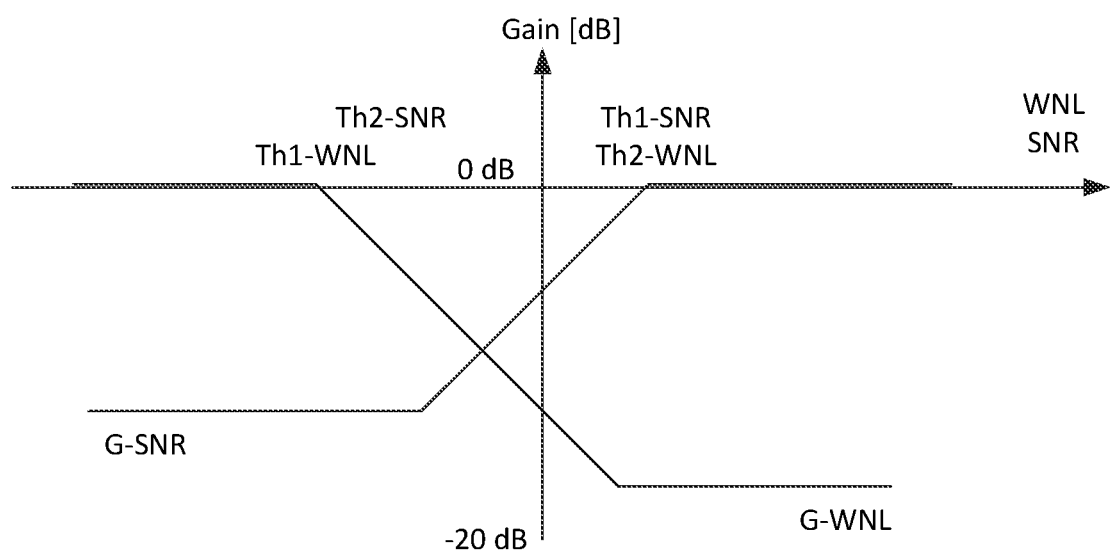
FIG. 12 shows a gain map for the post filter.

FIG. 12 shows a gain map for the post filter. The gain map includes one or more functions and/or tables mapping a signal-to-noise value, SNR, to a corresponding first gain value, G-SNR; and mapping a wind noise level, WNL, to a corresponding second gain value, G-WNL. The first gain value and the second gain value may be aggregated into one gain value.

It can generally be seen that the first gain values. G-WNL, above a first wind noise threshold value, Th1, applies progressively more noise reduction with increasing wind noise level values. The noise gain values, G-WNL, are limited to apply a maximum noise suppression level at wind noise level value above a second wind noise threshold value, Th2. An advantage is that wind noise suppression operations can remain operative while the multiplexing operations are suspended.

It can generally be seen that the second gain value, G-SNR, below a first SNR threshold value, Th1-SNR, applies progressively more noise reduction with decreasing signal-to-noise level values. The noise gain values, G-SNR, are limited to apply a maximum noise suppression level at signal-to-noise level values below a second signal-to-noise threshold value, Th2-SNR. An advantage is that noise suppression operations, to preferentially suppress non-voice signals, can remain operative while the multiplexing operations are suspended.

ADDITIONAL ASPECTS

Herein, signal-to-noise levels and wind noise levels may be computed as it is known in the art. In one example, the wind noise levels are computed as described in EP1448016-A1 or in U.S. Pat. No. 7,171,008 (assigned on its face to MH Acoustics LLC). In particular, the wind noise levels are conveniently computed using a delay-and-sum beamformer and a delay-and-subtract beamformer.

Herein, and as described in EP 2 765 787-A1 each input to multiplexer or one or more of the inputs to the multiplexer may be scaled by multiplication with an e.g., complex, correction value (weighing value). Further, in some embodiments different frequency bands (channels) may be weighted individually e.g., based on a wind noise level. Further, in some embodiments, the directional signal is weighted differently than the microphone signals e.g., to bias selection of the directional signal over the microphone signals.

Herein, a 'level' generally refers to an absolute value e.g., a power level. A 'level' may be obtained by e.g., a $1^{st}$ order IIR filter or by a sample-and-hold filter e.g., applying different 'attack' and 'release' time constants.

Herein, the one or more processors, e.g., including the processor 120, may include one or more integrated circuits embodied on one or more integrated circuit dies. The one or more processors including filters, the multiplexer and other units may be implemented by software performed by the one or more integrated circuits. The filters, the multiplexer and other units may thus be virtual units rather than distinct physical units.

The one or more processors may include one or more of: one or more analysis filter banks, one or more synthesis filter banks, one or more beamformers, one or more units configured to generate a compensation for a hearing loss, e.g., a prescribed hearing loss, one or more controller units, and one or more post-filters. The analysis filter banks may convert a time-domain signal to a time-frequency domain signal. The synthesis filter banks may convert a time-frequency domain signal to a time-domain signal. The post-filter may provide time-domain filtering and/or time-frequency domain filtering. The controller may be configured to control portions or units of the one or more processors and/or a transmitter/receiver/transceiver e.g., based on one or more programs, e.g., in response to signals from one or more hardware elements configured for receiving user inputs. The compensation for a hearing loss may be quantified during a fitting session, e.g., a remote fitting session. The one or more processors may be configured to execute instructions stored in the memory and/or stored in the processor.

The output unit may comprise one or more of: one or more amplifiers, one or more loudspeakers, e.g., miniature loudspeakers, one or more wireless transmitters, e.g., including transceivers.

In an embodiment, the hearing aid comprises a (single channel) post filter for providing further noise reduction (in addition to the spatial filtering of the beamformer filtering unit), such further noise reduction being e.g., dependent on estimates of SNR of different beam patterns on a time frequency unit scale, e.g., as disclosed in EP2701145-A1.

In the present context, a hearing aid, e.g., a hearing instrument, refers to a device, which is adapted to improve, augment and/or protect the hearing capability of a user by receiving acoustic signals from the user's surroundings, generating corresponding audio signals, possibly modifying the audio signals, and providing the possibly modified audio signals as audible signals to at least one of the user's ears. Such audible signals may e.g., be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g., acoustically, electrically, or optically) with each other. The loudspeaker may be arranged in a housing together with other components of the hearing aid or may be an external unit in itself (possibly in combination with a flexible guiding element, e.g., a dome-like element).

A hearing aid may be adapted to a particular user's needs, e.g., a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g., an audiogram, using a fitting rationale (e.g. adapted to speech). The frequency and level dependent gain may e.g., be embodied in processing parameters, e.g., uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g., a music player, a wireless communication device, e.g., a mobile phone (such as a smartphone) or a tablet or another device, e.g. comprising a graphical interface. Hearing aids, hearing systems or binaural hearing systems may e.g., be used for compensating for a hearing-impaired person's loss of hearing capability, augmenting, or protecting a normal-hearing person's hearing capability and/ or conveying electronic audio signals to a person. Hearing aids or hearing systems may e.g., form part of or interact with public-address systems, active ear protection systems, handsfree telephone systems, car audio systems, entertainment (e.g., TV, music playing or karaoke) systems, teleconferencing systems, classroom amplification systems, etc.

Other hearing aids are defined by the below items. Aspects and embodiments of the other hearing aids defined by the below items include the aspects and embodiments presented in the summary section and/or in the claims section.

1. A hearing aid with two or more microphones and a processor; wherein the processor comprises:
   a first filter bank configured to generate first time-frequency values and second time-frequency values in multiple frequency channels based on signals from the two or more microphones;
   a first beamformer configured to generate third time-frequency values, based on the first time-frequency values and the second time-frequency values;
   a multiplexer configured to perform multiplexing operations outputting fourth time-frequency values from the third time-frequency values and one or more of the first time-frequency values and the second time-frequency values; and
   a wind noise controller configured to, recurringly, determine a first wind noise level based on one or more of:

the first values, the second values, and the third values, and to determine whether the first wind noise level satisfies a first criterion;
wherein the multiplexer is further configured to perform static selection outputting the fourth time-frequency values from one of the third time-frequency values, the first time-frequency values and the second time-frequency values;
wherein the processor is configured to:
  change over operation of the multiplexer from performing multiplexing operations to perform static selection, in response a determination that the first wind noise level fails to satisfy the first criterion; and
  change over the operation of the multiplexer from performing static selection to perform multiplexing operations, in response a determination that the first wind noise level satisfies the first criterion.

2. A hearing aid with two or more microphones and a processor; wherein the processor comprises:
  a first filter bank configured to generate first time-frequency values and second time-frequency values in multiple frequency channels based on signals from the two or more microphones;
  a first beamformer configured to generate third time-frequency values, based on the first time-frequency values and the second time-frequency values;
a multiplexer configured to perform multiplexing operations outputting fourth time-frequency values from the third time-frequency values and one or more of the first time-frequency values and the second time-frequency values; wherein the multiplexer is further configured to perform static selection outputting the fourth time-frequency values from one of the third time-frequency values, the first time-frequency values and the second time-frequency values;
  a wind noise controller configured to, recurringly, determine a first wind noise level for each frequency channel in a set of frequency channels including a first frequency channel and a second frequency channel based on one or more of: the first values, the second values, and the third values;
  change over the operation of the multiplexer, in the first frequency channel, from performing multiplexing operations to perform static selection, in response a determination that the first wind noise level for the first frequency channel fails to satisfy a first criterion for the first frequency channel; and
  change over the operation of the multiplexer, in the second frequency channel, from performing static selection to perform multiplexing operations, in response a determination that the first wind noise level satisfies the first criterion for the second frequency channel.

3. A hearing aid with two or more microphones and a processor; wherein the processor comprises:
  a first filter bank configured to generate first time-frequency values and second time-frequency values in multiple frequency channels based on signals from the two or more microphones;
  a first beamformer configured to generate third time-frequency values, based on the first time-frequency values and the second time-frequency values;
a multiplexer configured to perform multiplexing operations outputting fourth time-frequency values from the third time-frequency values and one or more of the first time-frequency values and the second time-frequency values; wherein the multiplexer is further configured to perform static selection outputting the fourth time-frequency values from one of the third time-frequency values, the first time-frequency values and the second time-frequency values;
  a wind noise controller configured to, recurringly, determine a first wind noise level for each frequency channel in a set of frequency channels including a first frequency channel and a second frequency channel based on one or more of: the first values, the second values, and the third values;
wherein the processor is configured to, concurrently:
  perform multiplexing operations at least in the first frequency channel; and
  perform static selection at least in the second frequency channel not including the first frequency channel.

The invention claimed is:
1. A hearing aid with two or more microphones and a processor; wherein the processor comprises:
  a first filter bank configured to generate first time-frequency values and second time-frequency values in multiple frequency channels based on signals from the two or more microphones;
  a first beamformer configured to generate third time-frequency values, based on the first time-frequency values and the second time-frequency values;
  a multiplexer configured to perform multiplexing operations outputting fourth time-frequency values from the third time-frequency values and one or more of the first time-frequency values and the second time-frequency values;
  a first filter configured to perform first noise reduction based on filtering the fourth time-frequency values in accordance with recurringly determined noise gain values; and
  a wind noise controller configured to, recurringly, determine a first wind noise level based on one or more of: the first values, the second values, and the third values, and to determine whether the first wind noise level satisfies a first criterion, wherein the first criterion is satisfied when the first wind noise level exceeds an upper threshold and fails to be satisfied when the first wind noise level fails to exceed the lower threshold;
wherein the multiplexer is further configured to perform static selection outputting the fourth time-frequency values from one of the third time-frequency values, the first time-frequency values and the second time-frequency values;
wherein the wind noise controller is configured to:
  change over operation of the multiplexer from performing multiplexing operations to perform static selection, in response a determination that the first wind noise level fails to satisfy the first criterion; and
  change over the operation of the multiplexer from performing static selection to perform multiplexing operations, in response a determination that the first wind noise level satisfies the first criterion.

2. A hearing aid according to claim 1, wherein the multiplexer is configured to, concurrently:
  perform multiplexing operations in one or more first frequency channels; and
  perform static selection in one or more second frequency channels not including the first frequency channels;
wherein the first frequency channels and/or the second frequency channels are recurringly determined based on a first wind noise level for at least one frequency channel.

3. A hearing aid according to claim 1, wherein the first wind noise level is determined for at least some of the first frequency channels and for at least some of the second frequency channels; and wherein determining whether the first wind noise level satisfies the first criterion or fails to satisfy the first criterion is determined for the at least some of the first frequency channels and for the at least some of the second frequency channels.

4. A hearing aid according to claim 1, wherein the first wind noise level is determined for at least some of the first frequency channels and for at least some of the second frequency channels based on mapping a determined first wind noise level for a first frequency channel to the at least some of the first frequency channels and the at least some of the second frequency channels.

5. A hearing aid according to claim 1, wherein the processor is configured with a second filter, lowpass filtering the first wind noise level and outputting a filtered first wind noise level; and wherein the determination whether the first wind noise level satisfies the first criterion is based on the filtered first wind noise level.

6. A hearing aid according to claim 1, wherein the processor is configured to:
increase a first integrator value by a first value at a time when the first wind noise level satisfies a second criterion; and
decrease the first integrator value by a second value at a time when the first wind noise level fails to satisfy the second criterion; and
determine whether the first wind noise level satisfies the first criterion based on the first integrator value.

7. A hearing aid according to claim 1, wherein the wind noise controller is configured to determine the first wind noise level, for one or more time-frequency bins, based on a magnitude of decorrelation between the first time-frequency values and the second time-frequency values.

8. A hearing aid according to claim 1, wherein the processor is configured to:
generate a third processed signal, including sixth values, using second beamforming based on the first values and the second values;
wherein the first beamforming is based on first beamformer weight values; and
wherein the second beamforming is based on second beamformer weight values;
wherein the second beamformer weight values have a smaller magnitude than the first beamformer weight values;
wherein determining which fourth values to select is based on the sixth values and at least two of the first values and the second values.

9. A hearing aid according to claim 1, wherein the first filter is active in performing the first noise reduction at times when the static selection is performed and at times when the multiplexing operations are performed.

10. A hearing aid according to claim 1, wherein the noise gain values, above a first wind noise threshold value, apply progressively more noise reduction with increasing wind noise level values; and wherein the noise gain values are limited to apply a maximum noise suppression level at wind noise level value above a second wind noise threshold value.

11. A hearing aid according to claim 1, wherein the noise gain values, below a first signal-to-noise threshold value, apply progressively more noise reduction with decreasing signal-to-noise level values; and wherein the noise gain values are limited to apply a maximum noise suppression level at signal-to-noise level values below a second signal-to-noise threshold value.

12. A hearing aid according to claim 1, wherein the multiplexer is configured to select the fourth values, for each time-frequency bin, in accordance with selecting the first values, the second values, or the third values that have the lowest wind noise level in corresponding time-frequency bins.

13. A hearing aid according to claim 1, comprising:
an envelope detector configured to lowpass filter an absolute value of each of the first values, the second values and the third values and to output respective first envelope values, second envelope values, and third envelope values;
wherein the multiplexer is configured to select the fourth values, for each time-frequency bin, in accordance with selecting the first values, the second values, or the third values that have the lowest level in corresponding first envelope values, second envelope values, or third envelope values.

14. A hearing aid according to claim 1, comprising:
an output transducer; and
a second filter bank configured to generate a generate a time-domain signal for the transducer based on a signal from the first filter.

15. A pair of binaural hearing aids comprising a first hearing aid configured as the hearing aid of claim 1 and a second hearing aid;
wherein the first hearing aid and the second hearing aid are configured for wireless communication; and
wherein the first hearing aid is configured to communicate the first wind noise level to the second hearing aid.

* * * * *